June 26, 1951 H. J. WILLIAMS 2,558,115
LOCK FOR BRAKE SLACK ADJUSTERS
Filed Oct. 22, 1946
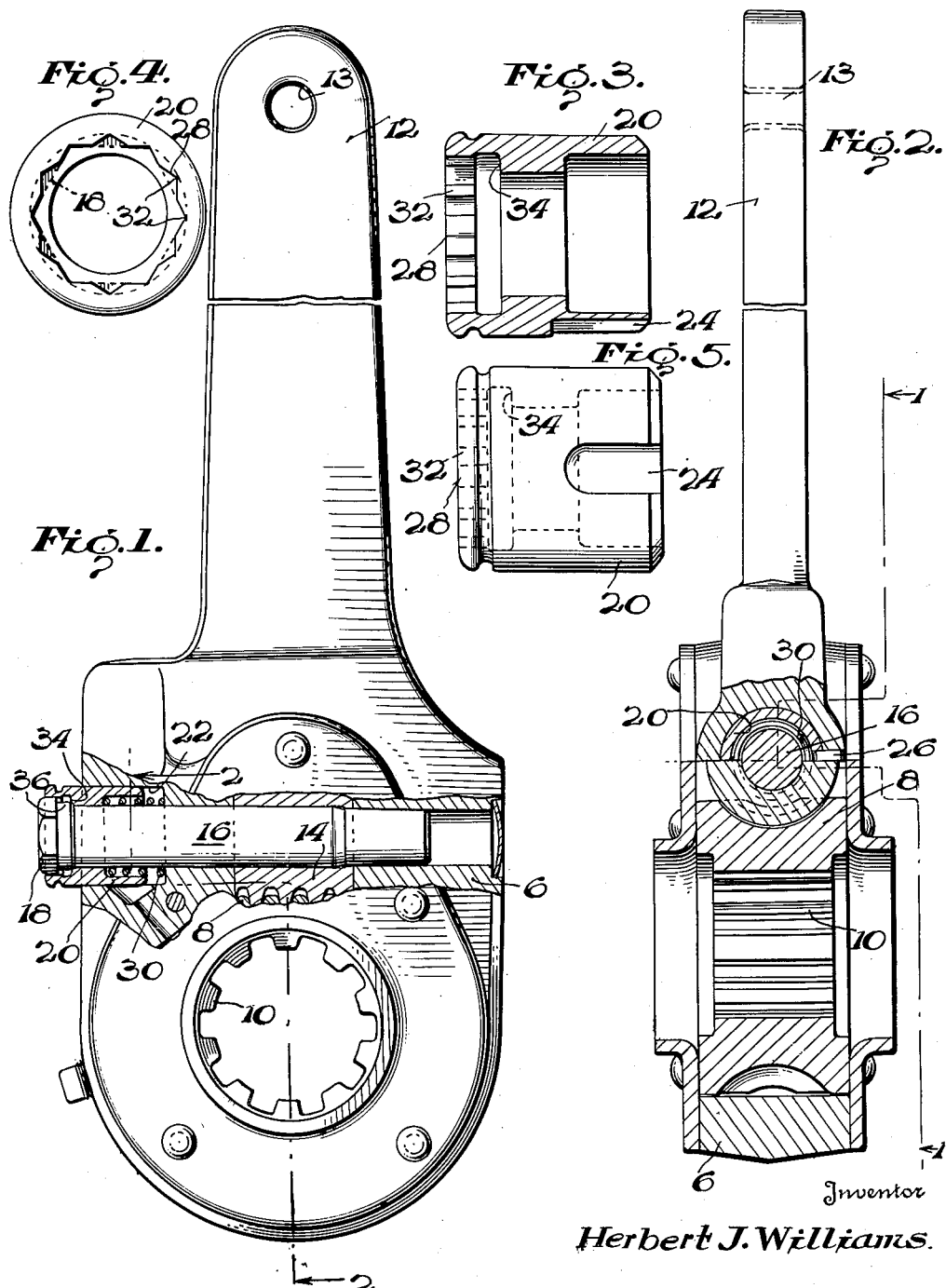
Inventor
Herbert J. Williams.
By Scrivener + Parker.
Attorneys Patented June 26, 1951

2,558,115

UNITED STATES PATENT OFFICE 2,558,115

LOCK FOR BRAKE SLACK ADJUSTERS

Herbert J. Williams, Elyria, Ohio, assignor to Bendix-Westinghouse Automotive Air Brake Company, Elyria, Ohio, a corporation of Delaware Application October 22, 1946, Serial No. 704,869

7 Claims. (Cl. 74—527)

This invention relates to slack adjusters for vehicle brakes and more particularly to a mechanism for positively locking the slack adjuster in a desired position of adjustment.

One of the objects of the present invention is to provide a slack adjuster construction for vehicle brakes of the type employing a worm wheel and a worm for adjusting purposes embodying a novel arrangement enabling a quick and ready adjustment of the parts, while insuring a positive locking thereof in any desired position of adjustment.

A further object is to provide a novel adjusting and locking mechanism for a brake slack adjuster wherein the unlocking of the parts is automatically effected upon the application thereto of a suitable wrench or tool, which is thereafter capable of movement to make the necessary adjustment, following which, removal of the tool automatically effects a re-locking of the parts in the newly adjusted position.

Still another object is to provide in a slack adjuster and locking mechanism of the above type, a novel and simplified arrangement of parts, which is highly efficient in operation, economical in cost of manufacture, and which possesses the advantage of being capable of rapid and positive adjustment throughout long periods of use.

The above and other objects and novel features of the invention will appear more fully hereinafter from a consideration of the following detailed description when taken in connection with the accompanying drawing illustrating one form of the invention. It is to be expressly understood, however, that the drawing is employed for purposes of illustration only and is not designed as a definition of the limits of the invention, reference being had for this purpose to the appended claims.

In the drawings, wherein similar reference characters refer to similar parts throughout the several views;

Fig. 1 is an end view partly in section, of a slack adjuster and locking means embodying the principles of the present invention, and taken along line 1—1 of Fig. 2.

Fig. 2 is a partial sectional view taken substantially along line 2—2 of Fig. 1;

Fig. 3 is a sectional view of a locking member for the slack adjuster worm;

Fig. 4 is an end view of the locking member, and

Fig. 5 is a side view thereof.

Slack adjusters of the type to which the present invention is directed usually comprise a casing provided with a worm wheel mounted on the brake cam shaft, together with a worm engaging the worm wheel for adjusting the position of the worm wheel relative to the casing to adjust the brakes. Various types of detents may be provided for maintaining the worm in various positions of adjustment. In the present instance, a positive lock of novel construction is utilized in order that the adjustment may be quickly and readily effected and the slack adjuster securely locked in position without danger of backing off, notwithstanding the high braking torque to which it may be subjected.

Referring more particularly to Fig. 1, a slack adjuster constructed in accordance with the present invention is illustrated therein as including a body 6 having a worm wheel 8 rotatably mounted therein and provided with a series of internal splines 10 for connection with the usual brake-operating cam shaft, not shown. As illustrated, the body 6 includes an extended portion 12 constituting a brake lever, the outer end of the lever having an opening 13 for receiving the end of a suitable brake actuating rod. A worm 14, carried by a worm shaft 16 rotatably mounted in the body 6, is positioned to mesh with the worm wheel 8, and preferably the outer end of the worm shaft 16 is provided with a convenient wrench-engaging head 18, such as being formed hexagonally, for example, in order that upon rotation of the worm shaft 16 and worm 14, relative movement will occur between the worm wheel 8 and the body 6 for the purpose of adjusting the position of the brake actuating cam shaft with respect to the brake actuating rod adapted to be connected with the brake lever 12. In this manner, any slack or clearance in the brake may be readily taken up.

The main feature of the present invention resides in a novel construction for positively locking the worm shaft 16 and worm 14 in any desired position of adjustment, the arrangement being such that the locking of the shaft and the unlocking thereof, may be quickly effected and in a relatively simple manner. As shown, such construction includes a locking sleeve or member 20 which is slidably received within a bore 22 of the body 6 and surrounds the free end of the adjustable worm shaft 16. In order to secure such relative sliding movement between the sleeve 20 and body 6, while preventing relative rotation between these parts, the sleeve is provided with an axially extending slot 24 partially cut through the wall thereof, within which a guide pin 26, carried by the body 6, extends, see Figs. 2, 3 and 5. By such a construction, when the worm shaft 16 is secured to the locking sleeve 20, in a manner to be now described, the said shaft is securely locked in adjusted position so as to be non-rotatable with respect to the body 6.

For the purpose of locking the sleeve 20 and the worm shaft 16 together, the outer end of the former is provided with a notched internal surface 28, which, in the position shown in Fig. 1, is adapted to embrace the head 18. As shown in this figure, a spring 30, within the bore 22 and interposed between the sleeve 20 and the body 6, normally acts to move the sleeve to the locking position illustrated. More particularly, and referring to Fig. 4, the head 18 is illustrated in dotted lines in one position of locked adjustment. It will be observed that in this case, the notched surface 28 includes twelve equally spaced notches 32, which are so spaced that alternate notches engage the corners of the hexagonal head 18. In this manner, twelve different locking positions of the worm shaft 16 are secured throughout one revolution of the latter, thus providing an arrangement for securing relatively fine adjustments of the slack adjuster. It will be understood of course, that the shape of the head 18 and the character of the surface 28, as described, is given by way of example only, and that other shapes may be utilized to secure a plurality of different locking positions between these parts, following adjusting movement of the worm shaft.

A further feature of the invention resides in arranging the locking sleeve 20 in such manner that the head 18 is protected from accumulations of grease and dirt. To this end, the spring 30 urges the sleeve 20 toward the left as viewed in Fig. 1, so that the outer end of the sleeve encloses substantially the entire head 18. The normal position of the parts is defined by an internal shoulder 34 on the sleeve and a cooperating flange 36 on the worm shaft 16, these parts being preferably so located that a portion of the head 18 extends but a slight distance beyond the end of the sleeve 20. It will be understood however, that if desired, the shoulder 34 may be so located on the sleeve 20, that the latter completely encloses the head 18 when the parts assume the normal locked position illustrated.

In operation, when it is desired to adjust the brake clearance, it is only necessary to apply to the exposed portion of the head 18, any type of wrench, having an opening fitting the head, and thereafter move the wrench and sleeve 20 axially of the worm shaft. During this operation, the sleeve 20 is moved to the right, as viewed in Fig. 1, and against the tension of spring 30, to release the engagement between the notched surface 28 and the head 18. The wrench may thereafter be rotated to adjust the position of the worm wheel 10 with respect to the body 6, and when the desired adjustment is completed, the wrench may be removed to permit the spring 30 to move the locking sleeve 20 toward the left to reengage the surface 28 with the head 18 in order to positively lock the worm shaft and worm wheel in the new position of adjustment, it being recalled that sliding movement of the sleeve 20 in opposite directions is permitted by the pin 26 and slot 24, but that these latter parts positively prevent any rotation of the sleeve with respect to the body 6.

It will be appreciated from the foregoing that the present invention provides a novel and efficiently operable locking means for a brake slack adjuster which is capable of positively locking the parts in various positions of adjustment, thereby eliminating all possibility of the adjuster backing off when subjected to high braking torques. An important advantage secured by the present construction resides in the ease with which adjustments are made, followed by an automatic relocking of the parts, it being observed that no special type of wrench is required to unlock the sleeve 20 and adjust the worm shaft 18. A further desirable feature includes the substantial enclosure of the head 18 by the end of the locking sleeve 20 to maintain the former in a clean and grease-free condition, and to allow a small portion of the head to be exposed, which is just sufficient to allow the operator to select a socket or end wrench of proper size or to permit him to properly adjust a jaw type of wrench. Further advantages include simplicity of construction and relatively low cost of manufacture.

While one embodiment of the invention has been illustrated and described herein, with considerable particularity, it will be understood by those skilled in the art that various changes and modifications may be made without departing from the spirit of the invention. Reference will therefore be had to the appended claims for a definition of the limits of the invention.

What is claimed is:

1. In a brake slack adjuster, a body, a shaft rotatably mounted in the body and having an end projecting outwardly of the body and formed to receive a wrench for rotating the shaft to adjust the latter with respect to the body, a locking sleeve slidably mounted in the body and surrounding said shaft, one end of said sleeve projecting outwardly from said body and being formed to closely embrace said end of said shaft, resilient means normally urging said sleeve in a direction such that said one end thereof embraces said end of the shaft, cooperating means on said shaft and sleeve to limit movement of the latter in said direction, and means connecting said sleeve and body to allow axial movement of the sleeve along said shaft but preventing rotation thereof in either direction.

2. In a brake slack adjuster, a body, a shaft rotatably mounted in the body and having an end projecting outwardly of the body and formed to receive a wrench for rotating the shaft to adjust the latter with respect to the body, a locking sleeve surrounding said shaft, one end of said sleeve being formed to closely embrace said end of said shaft, resilient means normally urging said sleeve in a direction such that said one end thereof embraces said end of the shaft, a slot formed in said sleeve and a pin carried by the body and projecting into said slot for allowing axial movement of the sleeve along said shaft but preventing rotation of the sleeve in either direction.

3. In a brake slack adjuster, a body, a shaft rotatably mounted in the body and having an end projecting outwardly of the body and formed to receive a wrench for rotating the shaft to adjust the latter with respect to the body, a locking sleeve slidably mounted in the body and surrounding said shaft, one end of said sleeve projecting outwardly from said body and being formed to closely embrace a portion of said end of said shaft, leaving a portion sufficient to accommodate a wrench, resilient means normally urging said sleeve in a direction such that said one end thereof embraces said end of the shaft, cooperating means on said shaft and sleeve to limit movement of the latter in said direction, and means within the body connecting said sleeve and body to allow axial movement of the sleeve along said shaft but preventing rotation thereof in either direction.

4. In a brake slack adjuster, a body, a shaft rotatably mounted in the body and having an end projecting outwardly of the body and formed to receive a wrench for rotating the shaft to adjust the latter with respect to the body, a locking sleeve slidably mounted in the body and surrounding said shaft, one end of said sleeve being formed to closely embrace a portion of said end of said shaft, leaving a portion sufficient to accommodate a wrench, resilient means normally urging said sleeve in a direction such that said one end thereof embraces said end of the shaft, a slot formed in said sleeve and a pin carried by the body and projecting into said slot for allowing axial movement of the sleeve along said shaft but preventing rotation of the sleeve in either direction.

5. In a brake slack adjuster, a body, a shaft rotatably mounted in the body and having an angularly shaped end projecting outwardly from said body to receive a wrench for rotating the shaft to adjust the latter with respect to the body, a locking sleeve slidably mounted in the body and surrounding said shaft, one end of said sleeve projecting outwardly from said body and being angularly shaped in the same manner as the end of the shaft to embrace said shaft end, resilient means normally urging said sleeve in a direction such that said one end thereof embraces said end of the shaft, cooperating means on said shaft and sleeve to limit movement of the latter in said direction, and means within the body connecting said sleeve and body to allow axial movement of the sleeve along said shaft but preventing rotation thereof in either direction.

6. In a brake slack adjuster, a body, a shaft rotatably mounted in the body and having an angularly shaped end projecting outwardly from said body to receive a wrench for rotating the shaft to adjust the latter with respect to the body, a locking sleeve surrounding said shaft, one end of said sleeve being angularly shaped in the same manner as the end of the shaft to embrace said shaft end, resilient means normally urging said sleeve in a direction such that said one end thereof embraces said end of the shaft, a slot formed in said sleeve and a pin carried by the body and projecting into said slot for allowing axial movement of the sleeve along said shaft but preventing rotation of the sleeve in either direction.

7. In a brake slack adjuster, a body, a shaft rotatably mounted in the body and having an angularly shaped end projecting outwardly from said body to receive a wrench for rotating the shaft to adjust the latter with respect to the body, a locking sleeve surrounding said shaft, one end of said sleeve being angularly shaped in the same manner as the end of the shaft to embrace said shaft end, resilient means normally urging said sleeve in a direction such that said one end thereof embraces a portion of said end of said shaft, leaving a portion sufficient to accommodate a wrench, and means including a pin and slot connection for connecting the sleeve and body to allow axial movement of the sleeve along said shaft but preventing rotation thereof in either direction.

HERBERT J. WILLIAMS.

REFERENCES CITED

The following references are of record in the file of this patent:

UNITED STATES PATENTS

| Number | Name | Date |
| --- | --- | --- |
| 1,084,566 | Strietelmeier | Jan. 13, 1914 |
| 2,156,154 | Hooker | Apr. 25, 1939 |
| 2,226,662 | Humphrey | Dec. 31, 1940 |
| 2,427,310 | Shumaker | Sept. 9, 1947 |
| 2,432,574 | Josefiak | Dec. 16, 1947 |